United States Patent
Norwood et al.

(10) Patent No.: US 6,256,428 B1
(45) Date of Patent: *Jul. 3, 2001

(54) CASCADING OF TUNABLE OPTICAL FILTER ELEMENTS

(75) Inventors: Robert A. Norwood, Cranford; David H. Sossen, Basking Ridge; Meade H. Rudasill, Mendham, all of NJ (US)

(73) Assignee: Corning Incorporated, Corning, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/251,893

(22) Filed: Feb. 19, 1999

(51) Int. Cl.$^7$ ...................................................... G02B 6/26
(52) U.S. Cl. .............................. 385/17; 385/12; 385/39; 385/47
(58) Field of Search ................................. 385/12, 15–18, 385/31, 37, 39–40, 47

(56) References Cited

U.S. PATENT DOCUMENTS

| | | | |
|---|---|---|---|
| 5,283,845 | * | 2/1994 | Ip ............................................. 385/24 |
| 5,459,799 | | 10/1995 | Weber ......................................... 385/2 |
| 5,608,825 | * | 3/1997 | Ip ............................................. 385/24 |
| 5,652,814 | * | 7/1997 | Pan et al. ................................... 385/24 |
| 5,748,349 | * | 5/1998 | Mizrahi ..................................... 359/130 |
| 5,798,867 | * | 8/1998 | Uchida et al. ............................. 359/629 |
| 5,841,918 | * | 11/1998 | Li ............................................. 385/24 |
| 5,889,899 | * | 3/1999 | Henry et al. .............................. 385/10 |
| 5,889,900 | * | 3/1999 | Hallemeier ................................ 385/11 |

OTHER PUBLICATIONS

Smith, David A, et al., "Evolution of the Acousto–Optic Wavelength Routing Switch" Journal of Lightwave Technology, vol. 14, No. 6, Jun. 1996.

Oh, Min–Cheol, et al., Polymeric Wavelength Filters with Polymer Gratings, American Institute of Physics, 1998.

Ogusu, M., et al., "A Thermally Stable Fabry–Perot Tunable Filter for 1 Å–Spaced High–Density WDM Systems", IEEE Photonics Technology Letters, vol. 5., No. 10, Oct., 1993.

Oh, Min–Cheol, et al., "Tunable Wavelength Filters with Bragg Gratings in Polymer Waveguides", Applied Physics Letters, vol. 73, No. 18, Nov. 2, 1998.

* cited by examiner

Primary Examiner—Rodney Bovernick
Assistant Examiner—Juliana K. Kang
(74) Attorney, Agent, or Firm—Watov & Kipnes, P.C.

(57) ABSTRACT

A tunable optical signal device and method of using the same having at least two filter elements, each of said filter elements being made of a material having an adjustable parameter, wherein the adjustable parameter is maintained at slightly different values for adjacent filter elements.

11 Claims, 6 Drawing Sheets

CASCADING OF TUNABLE OPTICAL FILTER ELEMENTS

FIELD OF THE INVENTION

The present invention is generally directed to improved integrated wavelength division multiplexer/demultiplexer optical devices in which light of a specific wavelength (or specific wavelengths) can be added or dropped in an efficient manner. In particular, the present invention is directed to providing a fine tune function of such devices by providing the optical elements with a material having slightly different values for a preselected variable such as temperature for one or more adjacent optical elements.

BACKGROUND OF THE INVENTION

Devices for adding and dropping wavelength coded signals (light of a specific wavelength or wavelengths) are known in the art. Such devices employ optical fibers which are utilized predominantly in telecommunications in addition to local area networks, computer networks and the like. The optical fibers are capable of carrying large amounts of information and it is the purpose of such devices of the present invention to extract a selected amount of information from the fiber by segregating the information carried on different wavelength channels.

Devices of this type are comprised of a variety of components which together provide the desired segregation of wavelength coded signals. Integrated optical couplers and especially directional couplers have been developed to accomplish evanescent directional coupling. Optical signals are coupled from one planar waveguide to another. The signals in the second planar waveguide propagate in the same direction in which the signals travel in the first planar waveguide.

Diffraction gratings (e.g. Bragg gratings) are used to isolate a narrow band of wavelengths. Such grating reflectors have made it possible to construct a device for use in adding or dropping a light signal at a predetermined center wavelength to or from a fiber optic transmission system without disturbing other signals at other wavelengths.

Wavelength division multiplexing systems are being deployed to greatly increase the band width capacity of existing optical fiber installations. Key components in these systems are the wavelength division multiplexers and demultiplexers that serve to combine and separate the individual wavelength signals at the two termini of the transmission system. These components include precision optical filters (e.g. Bragg gratings) that must be tailored specifically for each wavelength that is being transmitted. The number of wavelengths and their precise values vary from system to system and even within a system as a function of time as wavelength density increases.

The rapid growth of optical fiber-based telecommunications systems requires continual improvement in capacity of those systems to enable the management of increased bandwidth needs. There are several straightforward ways to increase the capacity of a system:

1. Install more optical fiber—this is the simplest approach but can be very expensive and time consuming;
2. Increase the data rage of the transmitters on the end of the fiber—this is cheaper and quicker than installing new fiber, but at high data rates (>5 Gigabits per sec), physical limitations of the optical fiber begin to be a problem, leading to unacceptably large dispersion of the optical pulse as it travels down the fiber;
3. Transmit at low data rates at multiple wavelengths—once again, there is a cost savings over installing new fiber and now the primary challenge for the optical components is in being able to provide stable lasers at many wavelengths over the preferred range of 1530 to 1560 nm, and also providing precise filters that can segregate a desired wavelength.

Optical components as mentioned in Item No. 3 above may be deployed in wavelength division multiplexing (WDM) systems that carry 4, 8, 16, 32, 40 64, and 80 wavelengths of light simultaneously. A number of technologies have been used to solve the filter problem, among them fiber Bragg gratings (FBG) as disclosed in (No. 1), arrayed waveguide grating (AWG) routers as disclosed in (No. 2), and thin film dielectric filters as disclosed in No. 3. All of these approaches result in filter characteristics of varying quality, with the preferred filter characteristic being a transmission of 100% at the wavelength of choice +/− some range, and 0% transmission at all other wavelengths. In terms of dB units, filters are desired that provide greater than 20 dB and preferably greater than 30 dB discrimination between the preferred wavelength band and all other wavelengths.

With the exception of the AWG, all other filter approaches rely on a sequential use of discrete filter elements. This places a high demand on the quality of each filter element. Furthermore, since approaches such as FBG and thin film dielectric filters are by their nature fixed filters, and not tunable, each wavelength to be filtered requires its own, uniquely manufactured filter. As used herein the term "tunable" means that the filter element can be adjusted in a manner that will enable optical signals of different wavelengths to be segregated.

For example, a FBG suitable for the ITU wavelength 1547.72 nm will be unsuitable for the ITU wavelength 1550.92 nm, where the ITU wavelengths represent standard communications wavelengths that have been adopted by telecom system suppliers. This situation results in a considerable increase in the cost to manufacture the filters, and also increases cost of ownership because of time consuming labeling and inventorying of these devices. Thus, there is a need for a technology that provides for post manufacture adjustment of the filter wavelength, i.e. a tunable filter. By way of example, if 40 filter elements were needed, they could all be made identically and then adjusted, either at a factory or in the field, to filter the desired wavelength. This provides a greatly increased modularity to the WDM filter system, reducing cost of manufacture and ownership.

There are several tunable filter technologies that have been developed, chief among them acousto-optic tunable filter (AOTF) as disclosed in (No. 4) and Fabry-Perot tunable filter (FPTF). AOTF's, based on the acousto-optic effect present in ferroelectric materials such as lithium niobate, work by using an acoustic wave, stimulated by a radio-frequency power supply and transducer, to induce densification and rarefaction in an optical waveguide material. In practice, AOTF's usually work by changing the polarization of light that is at a wavelength that is matched to the acoustically induced grating. This light may then be separated from the other wavelength components present. AOTF's have the advantages of providing very rapid tuning (microseconds) and complete blanking of the filter (when the radio-frequency power is removed). However, it is very difficult to achieve the spectral characteristics desired for WDM by this approach, in terms of isolation between different wavelength channels, insertion loss at a given wavelength channel, and, in particular, polarization independence. FPTF's have been worked both in bulk embodiments as disclosed in (No. 5), and, more recently, via micromechanical approaches as disclosed in (No. 6). While FPTF's can achieve relatively good filter performance, they have the disadvantage of requiring a physical movement to achieve tuning, which reduces the overall reliability.

An ideal tunable filter technology would have both the solid state tuning of AOTF's coupled with the good filter performance of FPTF's.

SUMMARY OF THE INVENTION

The present invention is directed to an optical signal system including cascading tunable optical filters in which an externally adjusted parameter such as temperature is maintained for each filter element at a slightly different value than the same parameter for an adjacent filter element. The resulting system provides for the precise segregation of multiple wavelength signals with less loss of intensity than is obtained with static optical signal devices employing separate filter elements for segregating each particular wavelength.

As used herein the term "tunable" means that the filter elements of the optical signal device may have its ability to reflect light varied preferentially for a preselected wavelength. The term "cascading" means that the optical signal device contains multiple tunable filter elements.

In one aspect of the present invention there is provided a tunable optical signal device comprising at least two filter elements, each of said filter elements being made of a material having an adjustable parameter, and means for maintaining the adjustable parameter.

In one aspect of the present invention there is provided a tunable optical signal device including at least two optical filter elements, each optical filter element comprised of a substrate, a pair of spaced apart cladding layers and a core layer including a pair of opposed waveguides, a grating region comprising a filter means for causing a single wavelength of light of a multiple wavelength light source to be segregated therefrom, said core layer comprised of a material having an adjustable property such that the adjustable property of one filter element can be maintained at a first value and the adjustable property of an adjacent filter element can be maintained at a second value different from the first value, and means for maintaining the first and second values of the adjacent filter elements.

In another aspect of the present invention there is provided an optical signal device comprised of a plurality of filter elements in which wavelengths $\lambda_1, \lambda_2, \ldots \lambda_N$ enter a 1×4 filter element that has one optical fiber coming in, four optical fibers with filtered wavelengths coming out, and one optical fiber with unfiltered wavelengths coming out. This filter is held at temperature $T_1$. This filter removes four of the wavelengths from the stream, $\lambda_1$ and three others, determined by the total number of channels N and the channel spacing. The wavelengths that aren't removed by this first filter then pass on to the second filter, held at temperature $T_2$. This filter is manufactured in exactly the same way as the first filter, but removes different wavelengths as it is held at a different temperature. The second filter performs the same function as the first filter, and the light then proceeds finally to the $N/4^{th}$ filter at which point all of the wavelengths have been filtered out.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

The present invention is directed to an optical signal device having a plurality of optical filter elements in which adjacent optical filter elements have different property values (e.g. are set at different temperatures).

In a preferred form of the invention, Mach-Zehnder type couplers or directional couplers are employed having two planar waveguides which are aligned with each other in two coupling regions or filter elements. Between the coupling regions or filter elements is a grating region comprised of a grating system (e.g. Bragg gratings). The waveguides are typically spaced apart from each other so that evanescent coupling does not occur in the grating region.

In accordance with the present invention, the optical signal device employs at least two such optical filter elements set at slightly different property values (e.g. slightly different temperatures) to enable the reflection of different wavelength signals.

The grating region is provided with a heater (such as an electrode of specified resistance) or other means of inducing a change of temperature of the polymer. The heaters of adjacent filler elements are controlled such that the respective optical filter elements are maintained at slightly different temperatures and thereby reflect different wavelengths of light (i.e. different wavelength optical signals). Alternatively, the mechanical stress value of adjacent optical filter elements may be set at different values. This will also result in the reflection of different wavelength signals.

Figure 1:
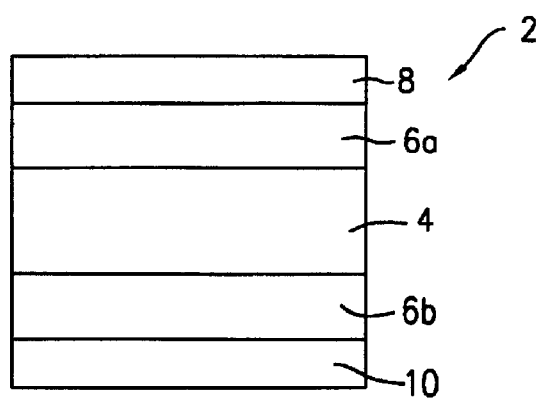
FIG. 1 is a schematic elevational view of one embodiment of a filter element employed in the optical signal devices of the present invention.

Referring to FIG. 1 there is shown a typical construction of an optical filter element of the optical signal device of the present invention and particularly the grating region. The filter element 2 includes a core region 4 having on each side thereof respective cladding layers 6A and 6B. Above the cladding layer 6A in the specific embodiment shown in FIG. 1 is a heater 8. Beneath the undercladding layer 6B there is provided a substrate 10. The overcladding layer 6A and undercladding layer 6B are made of thermosensitive polymers as described hereinafter. The core layer is typically made of the same type of material as the cladding layers although the refractive index of the respective layers will differ as discussed hereinafter.

Figure 2:
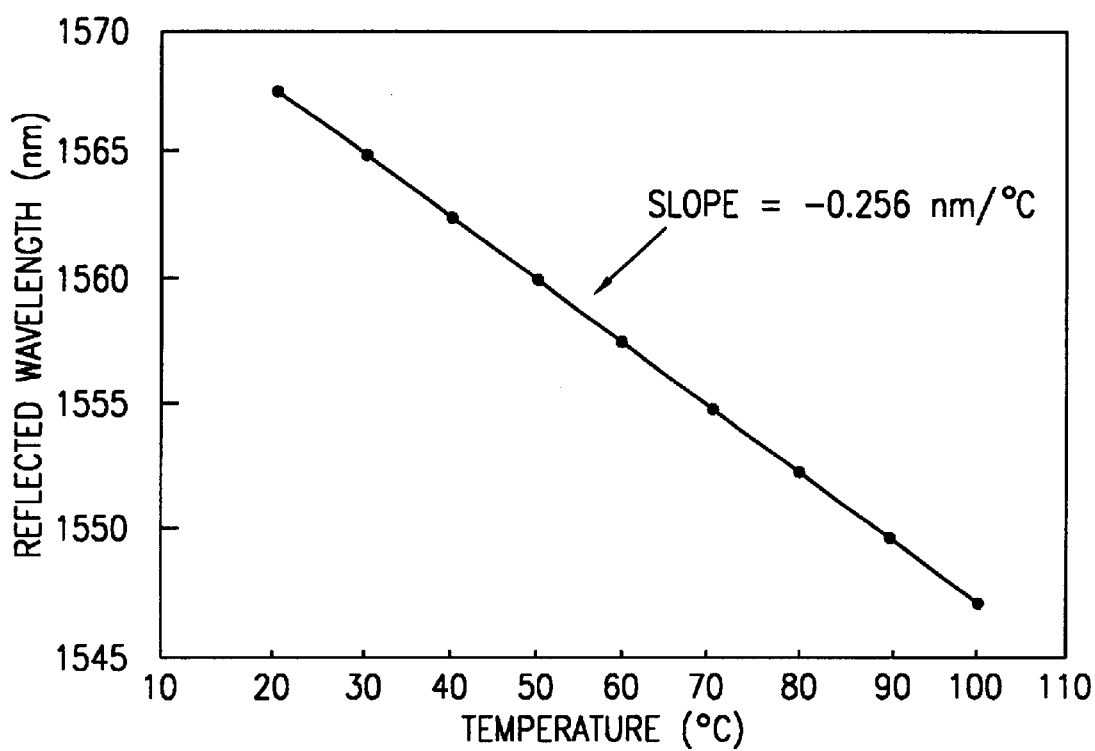
FIG. 2 is a graph showing the change in the wavelength of light reflected by an embodiment of a filter element employed in the present invention as a function of increasing temperature.

In accordance with the embodiment shown in FIG. 1, a heater is provided in proximity to the filter element to heat the thermosensitive polymers. As shown in FIG. 2, as the temperature of the filter element is increased, the wavelength of the reflected light will decrease, typically in a linear slope. As shown specifically in FIG. 2, the wavelength of the reflected light will decrease 0.256 nm per degree centigrade within the range of 20 to 100° C. The wavelength of the reflected light will vary linearly by about 20 nm within this temperature range. The embodiment of the present invention shown in FIG. 1 therefore changes the wavelength of the reflected light of a filter element of an optical signal device by raising or lowering the temperature of the material used to construct the filter element and by maintaining the temperature thereof at a different value than the temperature T of an adjacent optical filter element.

Figure 3:
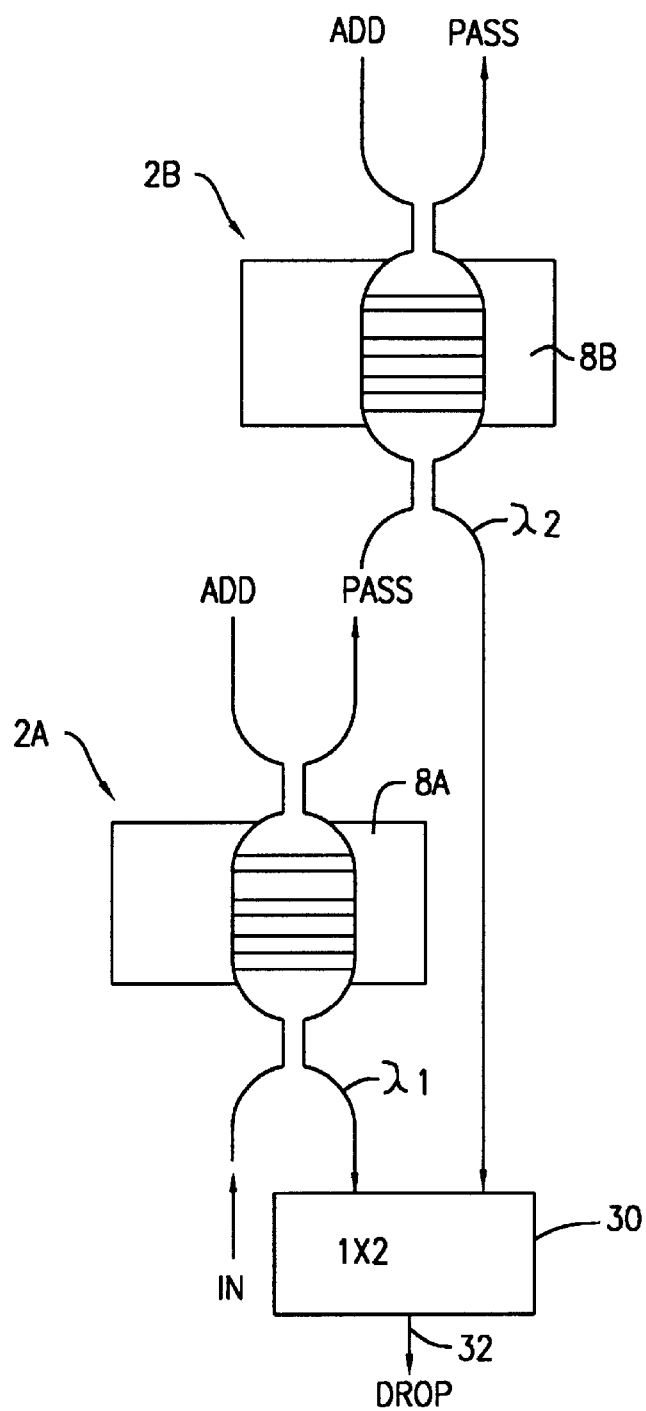
FIG. 3 is a schematic view of one embodiment of the optical signal device of the present invention employing multiple filter elements.

An embodiment of an optical signal device in accordance with the present invention is shown in FIG. 3. Each of the optical filter elements 2A and 2B, having the same construction and made of the same thermosensitive materials as described in connection with FIG. 1, includes a heating system as described hereinafter designated by the numerals 8A and 8B, respectively. The heating system 8A is set to maintain the optical filter element 2A at a temperature $T_1$ different than the temperature $T_2$ maintained by the heater 8B for the optical element 2B. In this embodiment a first selected wavelength $\lambda_1$ will be dropped from the filter element 2A and enter a 1×2 switch (shown by the numeral 30). The remaining light signal absent $\lambda_1$ will pass into the second filter element 2B. The temperature of the heater 8B will be adjusted to drop a different wavelength of light $\lambda_2$ which will likewise enter the switch 30. In the embodiment shown in FIG. 3, both wavelengths $\lambda_1$ and $\lambda_2$ are desirably employed by the user and the switch 30 enables the user to drop either $\lambda_1$ or $\lambda_2$ through a drop port 32 depending on need.

The particular wavelength of light which is dropped from the light source can be precisely selected in accordance with the present invention by adjusting the heater 8A in accordance with FIG. 2. In particular, for each ° C. that the temperature of the grating region is raised, the wavelength reflected will be reduced by 0.256 nm.

The remaining wavelengths of light which pass the filter element 2A may be further processed in a second filter element 2B which is heated by a heater 8B and maintained at a temperature different than the optical filter element 2A. As a consequence a second, different wavelength of light $\lambda_2$ is dropped from the second optical filter element 2B.

In another embodiment of an optical signal device of the present invention a circulator which is a three port device that delivers light entering port 1 to port 2 and light entering port 2 to port 3 is employed in conjunction with each optical filter element to segregate a one or more single wavelengths of light while allowing the remaining optical signal to pass through for eventual segregation of a different single or multiple band of wavelengths in an adjacent filter element.

Figure 4:
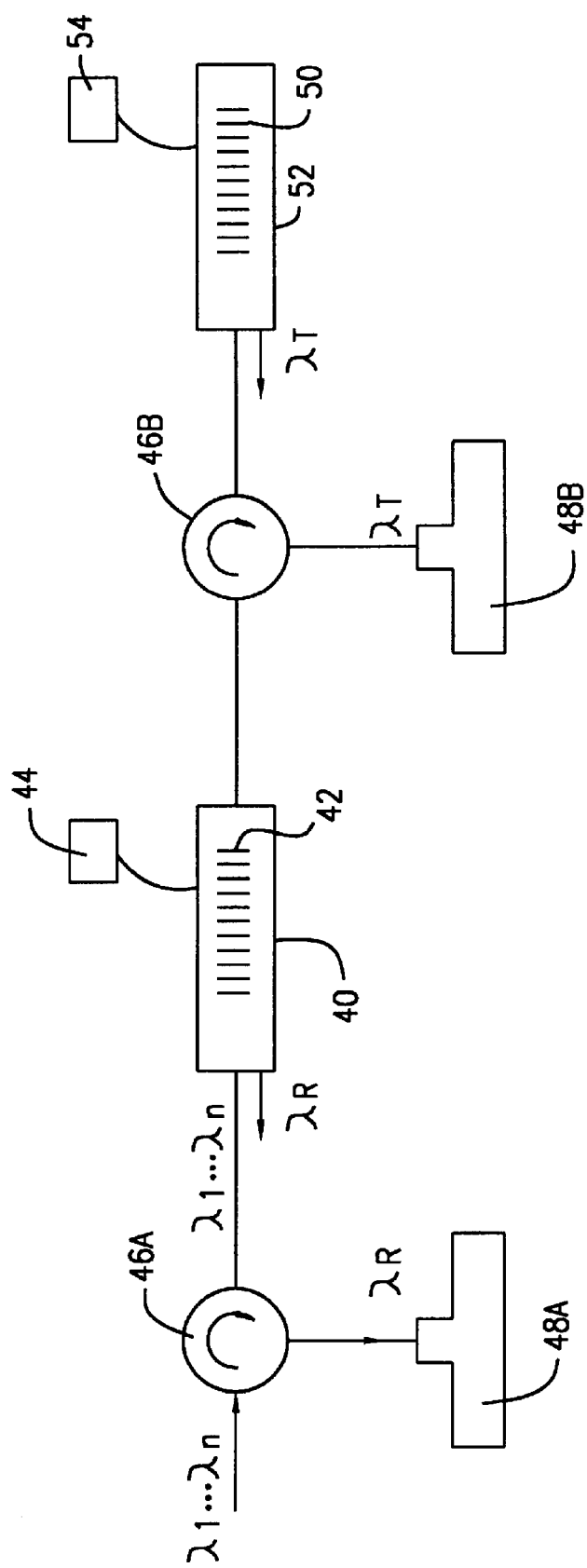
FIG. 4 is a schematic view of another embodiment of the invention employing a circulator for forwarding a segregated wavelength signal to a detector.

Referring to FIG. 4 there is shown an optical signal comprising wavelengths $\lambda_1 \ldots \lambda_n$ entering a filter element 40 including a grating system 42. The filter element is heated by a heater 44 to a temperature $T_1$ which results in the reflection of optical signal $\lambda_R$ to a circulator 46A as defined above resulting in the transmission Of $\lambda_R$ to a detector 48A.

The optical signal $\lambda_1 \ldots \lambda_n$ absent $\lambda_R$ is passed through the filter element 40 and enters a filter element 50 manufactured to the same specifications as filter element 40. The filter element 40 includes a grating system 52 and is connected to a heater 54 which heats the filter element 50 to a temperature $T_2$, different than the temperature $T_1$. As a result a different wavelength signal or set of wavelengths represented by $\lambda_T$ is reflected to a circulator 46B where the wavelength signal $\lambda_T$ is sent to a detector 48B.

Figure 5:
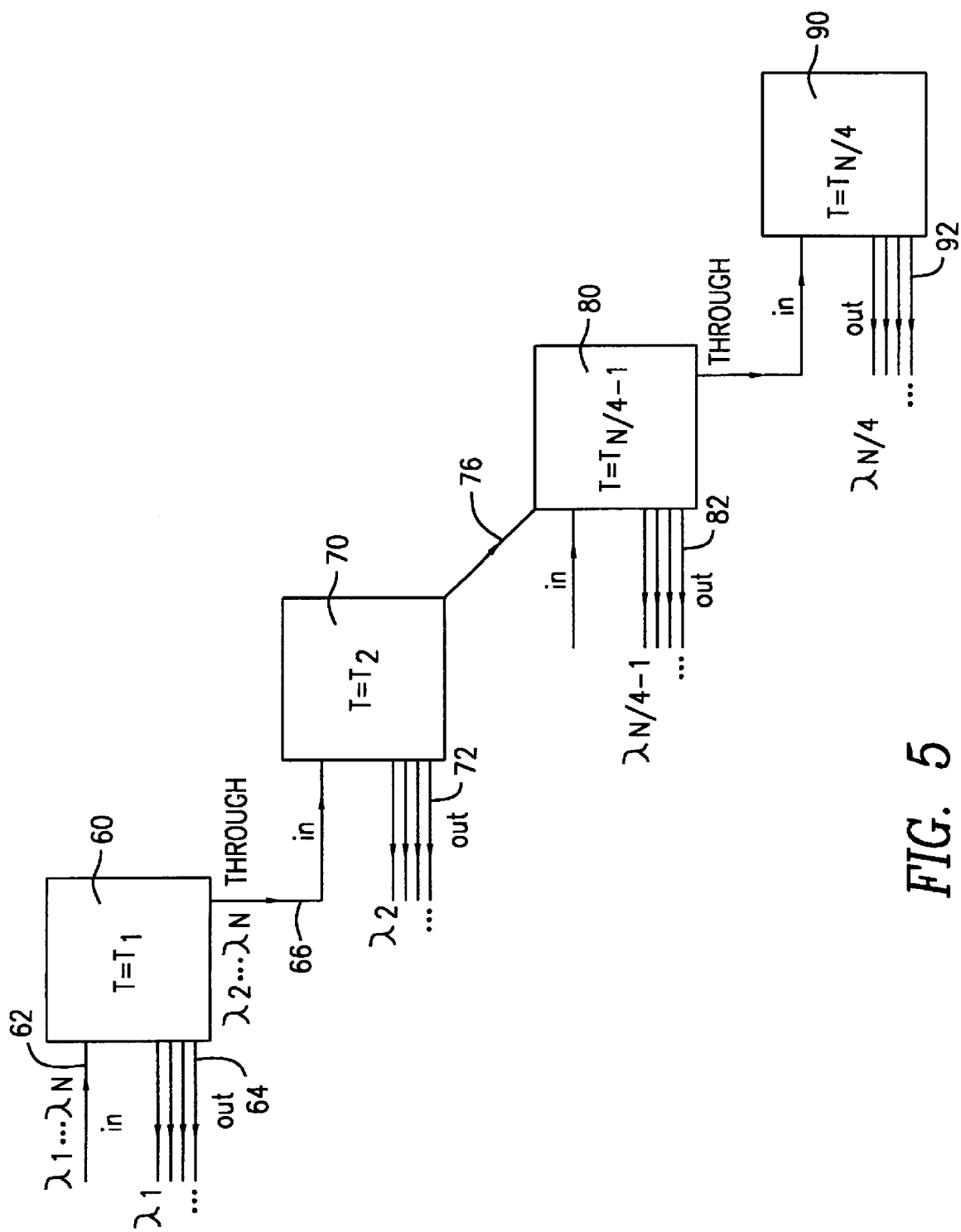
FIG. 5 is a schematic view of a still further embodiment of the present invention showing multiple filter elements for segregating an optical signal comprised of wavelengths $\lambda_1-\lambda_n$.

An embodiment of the present invention showing multiple filter elements is shown in FIG. 5. Wavelengths $\lambda_1, \lambda_2, \ldots \lambda_N$ enter, for example, a 1×4 filter element 60 that has one optical fiber 62 coming in, four optical fibers collectively shown as numeral 64 and filtered wavelengths coming out, and one optical fiber 66 with unfiltered wavelengths coming out. The filter element 60 is held at temperature $T_1$. This filter removes four of the wavelengths from the stream, $\lambda_1$ and three others, determined by the total number of channels N and the channel spacing. The wavelengths that aren't removed by this first filter then pass on to the second filter element 70, held at temperature $T_2$. This filter is manufactured in exactly the same way as the first filter, but removes different wavelengths through optical fibers 72 as it is held at a different temperature.

The unfiltered wavelengths pass through an optical fiber 76 into a filter element 80 held at a temperature $T_{N/4-1}$. The reflected wavelengths signal $\lambda_{N/4-1}$ passes out through optical fiber 82. Eventually the unfiltered wavelengths pass through a filter element 90 heated to a temperature $T_{N/4}$ and thereby reflects a corresponding wavelength signal through optical fiber 92 to complete the segregation of all wavelengths contained with the optical signal $\lambda_1 \ldots \lambda_n$.

A necessary condition for the embodiment shown in FIG. 5 is that the temperature required to achieve a channel spacing shift in wavelength not be so large as to be unfeasible. The second filter performs the same function as the first filter, and the light then proceeds finally to the N/4$^{th}$ filter at which point all of the wavelengths have been filtered out.

Figure 6:
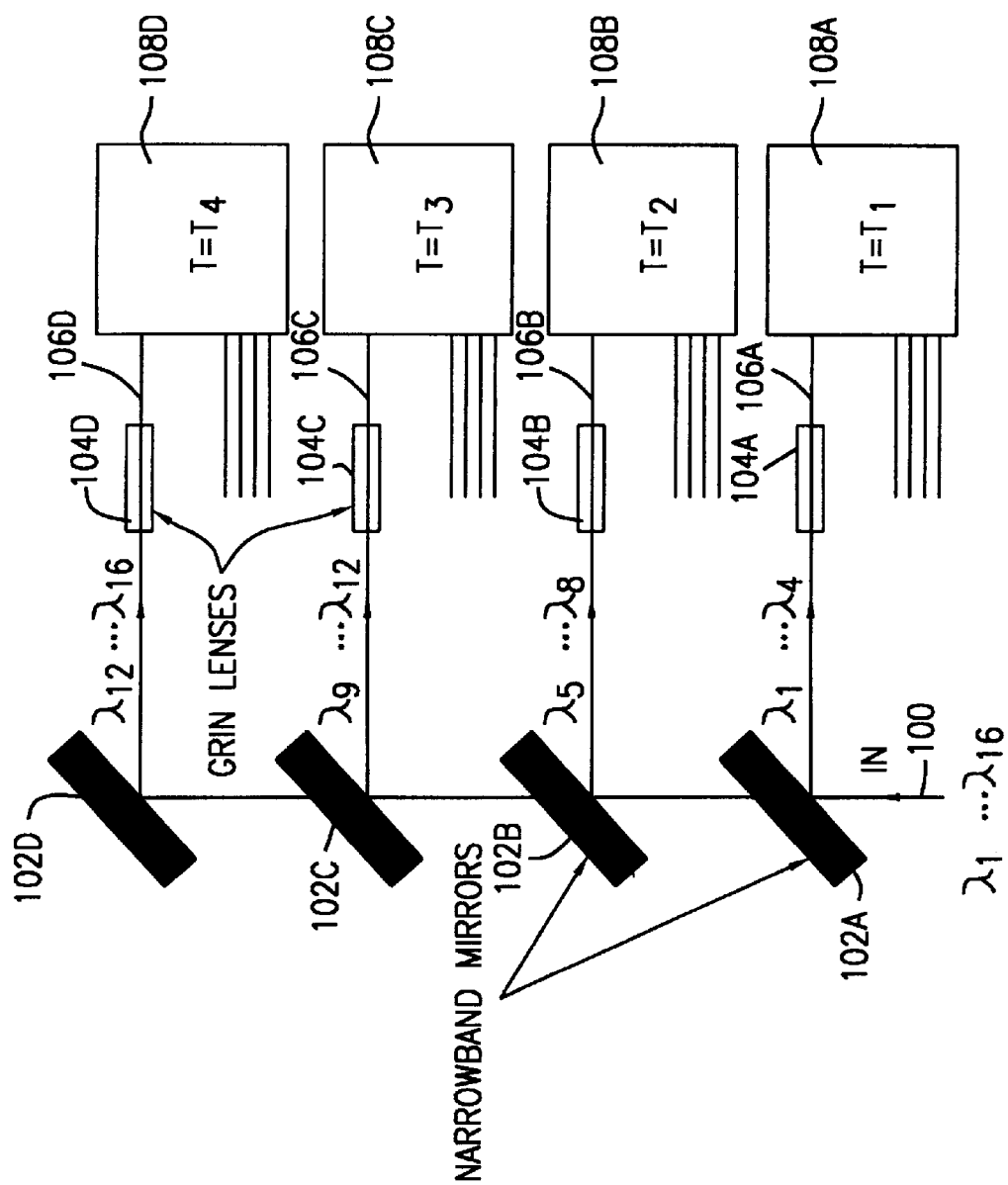
FIG. 6 is a schematic view of another embodiment of the present invention in which narrow band mirrors are used to selectively target a preset wavelength for each optical filter element.

An alternative approach that makes use of the common module architecture of FIG. 5 is shown in FIG. 6. FIG. 6 employs narrow band mirrors to segregate sets of wavelength signals (e.g. $\lambda_1-\lambda_4$) for an optical signal having multiple wavelengths $\lambda_1-\lambda_{16}$ (i.e. N=$\lambda_{16}$). It will be understood that the value of N may be larger or smaller and the number of filter elements may vary from that shown specifically in FIG. 6.

Referring to FIG. 6, the sixteen wavelengths enter via an optical fiber 100 that terminates in a GRIN collimating lens (not shown). The collimated light then proceeds to a narrowband mirror 102A that removes four of the wavelengths ($\lambda_1$ through $\lambda_4$). These four wavelengths are then collected with a GRIN lens 104A into an optical fiber 106 and are separated out by a 1×4 filter element 108A similar to that described in FIG. 5.

Wavelengths $\lambda_5-\lambda_{16}$ then proceed to the next narrowband mirror 102B which reflects the next four wavelengths $\lambda_5-\lambda_8$ which enter a GRIN lens 104B, an optical fiber 106B and a 1×4 filter element 108B. The process is repeated to remove wavelength signals $\lambda_9-\lambda_{12}$ and $\lambda_{13}-\lambda_{16}$ through additional series of GRIN lenses, optical fibers and 1×4 filter elements represented by numerals 102C through 108D until all of the wavelengths are segregated. While this embodiment is more complex than that shown in FIG. 5, it has the advantage of having better uniformity in the outputs. In the case of FIG. 5, the wavelengths exiting from the last module will be significantly more attenuated than those exiting from the first module owning to unavoidable coupling and propagation losses in the devices. For the embodiment shown in FIG. 6, it is possible to reduce the additional losses from the GRIN lenses and the mirrors to negligible levels, whereby all of the filtered signals are roughly equal in intensity (assuming they are equal in intensity at the input).

The tunable filter elements of the present invention are preferably manufactured as 1×N Mach-Zehnder or directional coupler integrated optical circuits incorporating Bragg gratings in a temperature sensitive optical material. Optical signal devices produced in this manner typically have opposed waveguides which comprise a core layer and upper and lower cladding layers as previously described in which the respective layers are preferably made of a photosensitive material which enables the application of a refractive grating system by photolithography.

In general, the optical signal device comprises a substrate having thereon a pair of spaced apart cladding layers have a core layer therebetween with the core layer including a pair of opposed waveguides. The waveguides are preferably applied to the core layer by direct photolithography. The filter is preferably in the form of a Bragg reflection grating system which preferably extends through the core and cladding layers to enable the single wavelength channel of light to be segregated from an input light source.

The substrates employed for fabrication of the optical signal device can be selected from a variety of materials including glass, silicon, plastics (e.g. polyurethane and polycarbonate) and the like. The undercladding layer and the overcladding layer are preferably made from photosensitive materials, preferably polymeric materials which have a lower refractive index value than the core layer. Such photosensitive materials include ethoxylated bisphenol diacrylate and chloroflourodiacrylate and are of the type of materials which can be treated with a source of energy to differentiate one region of the material (e.g. where the waveguides are imprinted) from another region of the material through the use of, for example, a photomask and the like. Tunable optical elements of this type are capable of being formed into single mode optical waveguide structures such as directional couplers by direct photolithography. Bragg gratings which are used as the filter elements can be formed through holographic illumination. The cross-linked, UV curable acrylate copolymers which are preferred for fabrication of the optical signal devices possess a large thermo-optic effect in that there is a measurable change in the refractive index with temperature, and in some cases a large photoelastic effect results in a change in the refractive index with applied mechanical stress when mechanical stress is to be used as the externally controlled variable.

The desirable properties for the thermosensitive materials include a large thermo-optic coefficient. The thermo-optic coefficient is defined as the change in refractive index with temperature, dn/dT, where n is the refractive index and T is the temperature. For typical glasses and inorganic dielectrics, the dn/dT is on the order of $1\times10^{-5}$/° C., while for polymers it is about $-2\times10^{-4}$/° C. This means that to effect a given change in refractive index, the temperature of a typical polymer need be changed only one-twentieth the amount that a typical glass would have to be changed. This results in thermally tuned filters being straightforward to implement in polymers.

Other desirable properties for the thermosensitive materials are high coefficient of thermal expansion, typically at least 50 ppm/° C., preferably from about 100 to 200 ppm/° C. and a low thermal conductivity, typically no more than about 0.5 W/m/° C., preferably from about 0.1 to 0.3 W/m/° C.

The heating systems employed in the present invention to heat and maintain the temperature of the optical filter element at a desired temperature include resistive film heaters, thermoelectric devices, ceramic heaters, thin film heaters and the like. It is important that the heating system have a control means to control the temperature of the thermosensitive materials and maintain the temperature at the desired temperature selected from the particular optical filter element.

Figure 7:
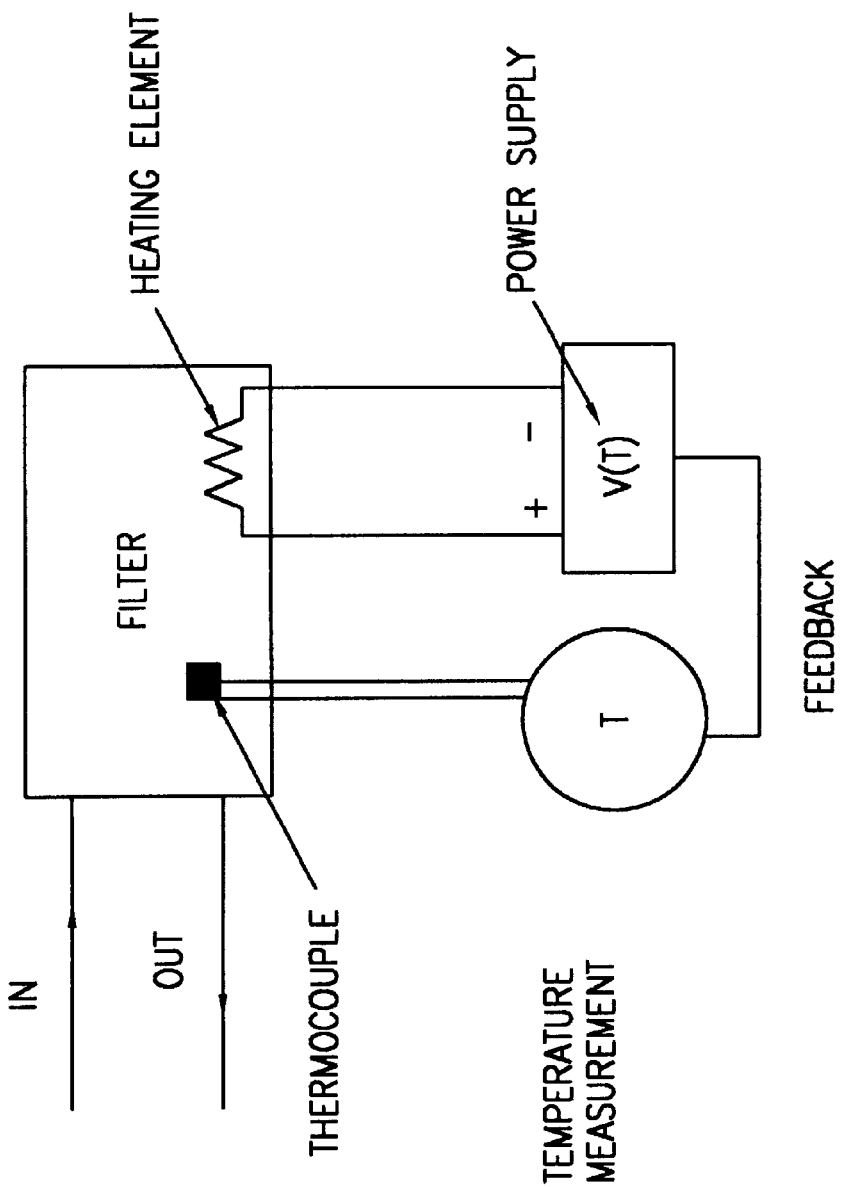
FIG. 7 is a schematic view of a temperature control system employed in the present invention to maintain respective elements at a desirable temperature.

One such heating system is shown in FIG. 7. The requirements for a thermally tuned filter with closed loop temperature control are shown in FIG. 7. The temperature is measured with a thermocouple; as the temperature varies from its setpoint (determined by the filtered wavelength desired) the power from the power supply to a resistive heating element is altered to maintain the desired setpoint temperature. Usually, the ambient temperature of the filter will be raised to a level 5 to 10° C. beyond the expected environmental variation in temperature. With polymer waveguide Bragg grating filters, the change in wavelength $\Delta\lambda$ is related to the change in temperature $\Delta T$ via $\Delta\lambda=-0.2\ \Delta T$ nm/° C. An additional advantage of certain polymer Bragg grating filters is their low optical loss and low birefringence. To realize a system such as is shown in FIG. 5, each stage would differ from the next stage by a channel spacing. If a typical channel spacing is 0.8 nm, then $T_2=T_1-4$, and thus $T_i=T_1-4*i$, where $T_i$ is the temperature of the ith stage. For a system such as that shown in FIG. 6, each stage will be shifted from the adjacent stage by 4 channel spacings, so we have $T_2=T_1-16$, and, in general $T_i=T_1-16*i$. Thus, the insertion loss advantage of the system in FIG. 6 is traded off against the need to hold the stages at larger differences in temperature.

EXAMPLE 1

A four channel tunable demultiplexer based on polymer waveguide gratings is used as defined in FIG. 5. The channel spacing of the demultiplexer is 400 GHz or 3.2 nm. The specific wavelengths filtered when the device is held at 60° C. are 1547.72, 1550.92, 1554.12, and 1557.32 nm. There is one input single-mode fiber, four output single-mode fibers and a throughport single mode fiber. All fibers are Corning SMF-28. It is preferred that the input fiber be connectorized with an angle polished connector to reduce back reflection. The four output fibers are terminated with FC/PC connectors. The throughport has an angle polished connector or comes out to a pigtailed fiber which is connected to the next demultiplexer which is identical to the first one except that it is held at temperature $T_2=64°$ C., and filters wavelengths 1548.52, 1551.72, 1554.92 and 1558.12 nm. Two subsequent demultiplexers held at temperatures 68° C. and 72° C. filter wavelengths 1549.32, 1552.52, 1555.72 and 1559.96, and 1550.12, 1553.32, 1556.52, and 1560.72 nm, respectively. Interchannel crosstalk for the filtered channels is <−30 dB. The cumulative loss of light experienced at the final throughport for nonfiltered wavelengths is on the order of 15–20 dB.

EXAMPLE 2

A four channel tunable demultiplexer based on polymer waveguide gratings is used as defined in FIG. 6. The channel spacing of the demultiplexer is 100 GHz or 0.8 nm. The specific wavelengths filtered are 1547.72, 1548.52, 1549.32 and 1550.12 nm when the device is held at 60° C. There is one input single-mode fiber connectorized with an angle polished connector. The light from the fiber is launched into a GRIN lens provided by NGK that collimates the light from the fiber. This light is then incident on a thin filter interference filter made by OCLI that reflects at greater than 95% wavelengths from 1547.5 to 1550.3 nm. The light reflected is directed at another GRIN lens that focuses the light back down into the input fiber of the demultiplexer which then separates out the four wavelengths. Light not reflected by the first thin film interference filter passes to the next one, $F_2$, which reflects wavelengths from 1550.5 to 1553.5 nm with greater than 95% efficiency. Light is then directed through a GRIN lens into another four channel demultiplexer, identical to the first one but held at temperature $T_2=76°$ C., and filtering specific wavelengths 1550.92, 1551.72, 1552.52 and 1553.32 nm. Thin film interference filters $F_3$ and $F_4$ act similarly, reflecting wavelength bands 1553.5 to 1556.7 and 1557.0 to 1560.2 nm, respectively. Four channel demultiplexers at temperatures 92° C. and 108° C. then capture wavelengths 1554.12, 1554.92, 1555.72 and 1556.52 nm and 1557.32, 1558.12, 1558.92 and 1559.72 nm, respectively. The interchannel crosstalk for the filtered channels is <−20 dB. The cumulative loss experienced by light that has not been filtered is on the order of 5 dB.

Although the present invention has been specifically described with reference to temperature as the variable which distinguishes adjacent filter elements, it is within the scope of the present invention to employ other variables such as materials whose mechanical stress can be varied. More specifically for a mechanically tuned polymer Bragg grating cascaded tunable filter system of the type shown in FIG. 3, the stages will be maintained in a different state of mechanical stress, such that the lowest wavelength in one of the stages is at $\lambda_0$ and the difference in strain between each successive stage is give by $\Delta\epsilon=\Delta\lambda_{WDM}/(d\lambda_B/d\epsilon)$. The derivative, $d\lambda_B/d\epsilon$, is related to the photoelastic constants of the material, which depend on the refractive indices, the Poisson ratio, and generalized Pockel's coefficients, in general.

What is claimed:

1. A tunable optical demultiplexer signal device comprising at least two filter elements, each of said filter elements having a single conduit entering the filter element with a plurality of wavelengths of light, a plurality of conduits leaving the filter element with each conduit having a single wavelength of light, and another single conduit which connects said at least two filter elements while passing unfiltered wavelengths from one filter element to another each of said filter elements being made of at least one thermosensitive polymer and means for maintaining the temperature of each filter element at a slightly different value.

2. The tunable optical signal device of claim 1 wherein the filter elements are Mach-Zehnder interferometers integrated with tunable Bragg gratings.

3. The tunable optical signal device of claim 1 wherein the means for maintaining the temperature of each filter element comprises:
   a) a thermocouple for measuring the temperature of the thermosensitive polymer;
   b) a temperature sensor for comparing the temperature of the thermosensitive polymer to a preset temperature; and
   c) a heater for applying heat to the thermosensitive polymer to maintain and preset temperature.

4. The tunable optical signal device of claim 1 further comprising a circulator and a tunable Bragg grating.

5. The tunable optical signal device of claim 1 further comprising a plurality of narrow band mirrors, each mirror segregating a set of a plurality of wavelength signals and directing said set of wavelength signals to said filter element.

6. The tunable optical signal device of claim 5 further comprising GRIN lenses for collimating said set of wavelength signals before said set of wavelength signals enter the filter element.

7. The tunable optical signal device of claim 1 comprising:
   a) a core region;
   b) at least one cladding layer on each side of the core region, each cladding layer comprised of said thermosensitive polymer; and
   c) a substrate.

8. The tunable optical signal device of claim 1 wherein the thermosensitive polymer reflects light over a range of about 20 nm over a temperature of from 20 to 100° C.

9. The tunable optical signal device of claim 1 wherein each optical filter element comprises a substrate, a pair of spaced apart cladding layers and a core layer including a pair of opposed waveguides, a grating region comprising a filter means for causing a single wavelength of light of a multiple wavelength source to be segregated therefrom, said core layer comprised of a thermosensitive polymer such that the temperature of one filter element can be maintained at a first value and the temperature of an adjacent filter element can be maintained at a second value different from the first value, and means for maintaining the first and second temperature values of the adjacent filter elements.

10. The tunable optical signal device of claim 1 wherein the conduit is an optical fiber.

11. A method separating at least one preselected wavelength of light from/to an optical signal comprising passing said optical signal through a tunable optical demultiplexer, signal device comprising at least two filter elements, each of said filter elements having a single conduit of light entering the filter element with a plurality of wavelengths of light, a plurality of conduits leaving the filter element with each conduit having a single wavelength of light, and another single conduit which connects said at least two filter elements while passing unfiltered wavelengths from one filter element to another each of said filter elements being made of at least one thermosensitive polymer, and means for maintaining the temperature of each filter element at a slightly different value, said method comprising adjusting said temperature to reflect said at least one preselected wavelength of light.

\* \* \* \* \*

UNITED STATES PATENT AND TRADEMARK OFFICE
CERTIFICATE OF CORRECTION

PATENT NO. : 6,256,428 B1
DATED : July 3, 2001
INVENTOR(S) : Robert A. Norwood, David H. Sossen and Meade H. Rudasill It is certified that error appears in the above-identified patent and that said Letters Patent is hereby corrected as shown below:

Claim 1,
Line 8, after "another" insert -- , --;

Claim 3,
Last line cancel "and" insert -- the --;

Claim 11,
Line 1, after "method" insert -- of --;
Line 3, cancel the "," at the end of the line; and
Line 11, after "another" insert -- , --.

Signed and Sealed this

Twenty-sixth Day of March, 2002

Attest:

JAMES E. ROGAN
*Attesting Officer*      *Director of the United States Patent and Trademark Office*